(12) United States Patent
Sasaoka et al.

(10) Patent No.: US 8,141,110 B2
(45) Date of Patent: Mar. 20, 2012

(54) LIGHT-SOURCE HOLDER AND OPTICAL PICKUP HAVING SAME

(75) Inventors: Hiromasa Sasaoka, Osaka (JP); Teruaki Sogawa, Osaka (JP); Fumiaki Mori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 403 days.

(21) Appl. No.: 12/415,453

(22) Filed: Mar. 31, 2009

(65) Prior Publication Data

US 2009/0284971 A1 Nov. 19, 2009

(30) Foreign Application Priority Data

Apr. 3, 2008 (JP) ................................. 2008-096947

(51) Int. Cl.
*G11B 7/125* (2012.01)
*G11B 7/08* (2006.01)

(52) U.S. Cl. ..................... 720/672; 720/681; 359/827

(58) Field of Classification Search .................. 720/672, 720/676, 681; 359/827
See application file for complete search history.

(56) References Cited

U.S. PATENT DOCUMENTS

2005/0086677 A1  4/2005 Ochi et al. .................... 720/659
2007/0115615 A1 * 5/2007 Hamatani ..................... 361/600
2009/0055851 A1 * 2/2009 Tanaka et al. ................ 720/695

FOREIGN PATENT DOCUMENTS

| EP | 1 381 040 A2 | 1/2004 |
| JP | 60-90854 | 6/1985 |
| JP | 09063064 A * | 3/1997 |
| JP | 2003-187478 | 7/2003 |
| JP | 2003-217134 | 7/2003 |
| JP | 3779608 B2 | 7/2003 |
| JP | 3833934 B2 | 7/2003 |
| JP | 2004-111507 A | 4/2004 |
| JP | 2005-11401 A | 1/2005 |
| JP | 2005-108300 A | 4/2005 |

* cited by examiner

*Primary Examiner* — Will J Klimowicz
(74) *Attorney, Agent, or Firm* — Morgan, Lewis & Bockius LLP

(57) ABSTRACT

A light-source holder used to hold a light source disposed in an optical pickup comprises: a holder main body portion; a through hole which penetrates the holder main body portion and in which a light source is fitted; a first hold potion that holds a first light source if the first light source is fitted in the through hole from a first side, one of first and second sides of the holder main body portion which are opposite to each other with respect to the holder main body portion; and a second hold portion that holds a second light source if the second light source is fitted in the through hole from a second side, one of the first and second sides of the holder main body portion which are opposite to each other with respect to the holder main body portion.

8 Claims, 4 Drawing Sheets

LIGHT-SOURCE HOLDER AND OPTICAL PICKUP HAVING SAME

This application is based on Japanese Patent Application No. 2008-096947 filed on Apr. 3, 2008, the contents of which are hereby incorporated by reference.

BACKGROUND OF THE INVENTION

1. Field of the Invention

The present invention relates to a light-source holder that is used to hold a light source disposed in an optical pickup, and also relates to an optical pickup having the light-source holder.

2. Description of Related Art

Optical recording media such as compact discs (hereinafter, referred to as CD), digital versatile discs (hereinafter, referred to as DVD) etc. have been widely used. Further, in recent years, optical recording media such as Blu-ray discs (hereinafter, called BD) and the like that can record large-size information have also been put to practical use. To carry out reading and writing of information from and to such an optical recording medium, an optical pickup is used.

In an optical pickup, for example, to carry out reading and writing of information from and to a CD, light having a wavelength of, for example, 780 nm is used. For a DVD, light having a wavelength of, for example, 650 nm is used, and for a BD, light having a wavelength of, for example, 405 nm is used. Accordingly, in some conventional optical pickups, a plurality of light sources which emit light having respective wavelengths different from each other are used.

In an optical pickup, conventionally, a semiconductor laser device is used as a light source that is used to direct light to an optical recoding medium. Such a semiconductor laser device is generally mounted on an optical pickup with held by a holder (e.g, see patent documents 1 to 3). And, if a plurality of semiconductor laser devices are used to carry out reading and writing of information from and to a plurality kinds of optical recording media, the semiconductor laser devices need respective holders.

Laser light emitted from a semiconductor laser device used in an optical pickup is generally linearly polarized light. And, in some optical pickups that comprise a plurality of semiconductor laser devices, polarization directions of laser light (linearly polarized light) emitted from the respective semiconductor laser devices are different from each other. In such a case, because mount directions (mount angles) in which the semiconductor laser devices are mounted on a holder are different from each other, it is necessary to use different-structure holders for the respective semiconductor laser devices. Accordingly, it is necessary to prepare different molds for the different-structure holders and make the holders separately, which causes increase in production cost of the pickups.

[patent document 1] JP No. 3779608
[patent document 2] JP No. 3833934
[patent document 3] JP-A-2004-111507

SUMMARY OF THE INVENTION

The present invention has been made to cope with the conventional problems, and it is an object of the present invention to provide a light-source holder that is low in cost even if it is required to hold a plurality of light sources which an optical pickup includes. And, it is another object of the present invention to provide an optical pickup that includes a light-source holder according the present invention and is able to be produced at low cost even if the optical pickup comprises a plurality of light sources.

To achieve the object, a light-source holder according to the present invention used to hold a light source disposed in an optical pickup comprises: a holder main body portion; a through hole which penetrates the holder main body portion and in which a light source is fitted; a first hold potion that holds a first light source if the first light source is fitted in the through hole from a first side, one of first and second sides of the holder main body portion which are opposite to each other with respect to the holder main body portion; and a second hold portion that holds a second light source if the second light source is fitted in the through hole from a second side, one of the first and second sides of the holder main body portion which are opposite to each other with respect to the holder main body portion.

According to this structure, it is possible to fit two different light sources in the light-source holder from the different sides. Accordingly, even if a plurality of light sources are needed for an optical pickup, the number of light-source holders to be prepared is able to be reduced. And, for example, even if an optical pickup requires two light sources, a kind of light-source holder needs only to be prepared. Accordingly, it is possible to curb production cost of the pickup.

The above light-source holder may have the following structure as a specific structure, in which a ring-shape stopper portion protruding from an inner wall of the through hole is formed at a substantially central portion in a penetration direction of the through hole, the first and second hold portions are formed at positions which are opposite to each other with respect to the stopper portion, the first hold portion is provided with a first press portion which protrudes from the inner wall of the through hole and presses part of the first light source fitted in from the first side, and the second hold portion is provided with a second press portion which protrudes from the inner wall of the through hole and presses part of the second light source fitted in from the second side.

According to this structure, if the first light source or the second light source is press-fitted in the through hole, the stopper portion functions as a lock member for the light source. Accordingly, even if any one of the first and second light sources is mounted, it is possible to stably hold the light source.

In the light-source holder having the above structure, a structure may be employed, in which a groove portion is formed on the first and second light sources, the first holder portion is equipped with a first engagement portion that protrudes from the inner wall of the through hole and engages with the groove portion of the first light source, the second holder portion is equipped with a second engagement portion that protrudes from the inner wall of the through hole and engages with the groove portion of the second light source. In this structure, directions in which the first and second engagement portions protrude from the inner wall of the through hole may be different form each other.

In some cases where two light sources are incorporated in an optical pickup, polarization directions of linearly polarized light emitted from the light sources are different from each other. In such cases, mount directions of the light sources are different from each other. In this respect, according to this structure, it is possible to control the mount directions of the light sources according to the protrusion directions of the engagement portions. And, even if the mount directions of the two light sources are different from each other, it is unnecessary to prepare two light-source holders, which is able to curb production cost.

In the light-source holder having the above structure, a structure may be employed, in which fig holes are so formed through the holder main body portion as to be opposite to each other with respect to the through hole, penetrate the holder main body portion in the same direction as the through hole, and allow the holder main body portion to be held with jigs. According to this structure, because the jig holes are through holes, it is possible to easily carry out optical-axis alignment of the light source using jigs even if any one of the first and second light sources is mounted on the light-source holder.

Besides, to achieve the above object, an optical pickup according to the present invention comprises: the light-source holder having the above structure; the first light source; and the second light source. According to this structure, despite the two light sources being employed, because only one kind of light-source holder needs to be prepared to fabricate an optical pickup, it is possible to curb the production cost.

The above optical pickup may have the following structure as a specific structure, in which the first light source is a semiconductor laser device that emits laser light for a BD, and the second light source is a semiconductor laser device that emits laser light switching for a DVD and a CD.

According the present invention, even if the optical pickup comprises a plurality of light sources, it is possible to curb the cost required for the light-source holder that holds the light sources.

DETAILED DESCRIPTION OF THE PREFERRED EMBODIMENTS

Hereinafter, present embodiments of a light-source holder and an optical pickup according to the present invention are explained with reference to drawings.

Figure 1:
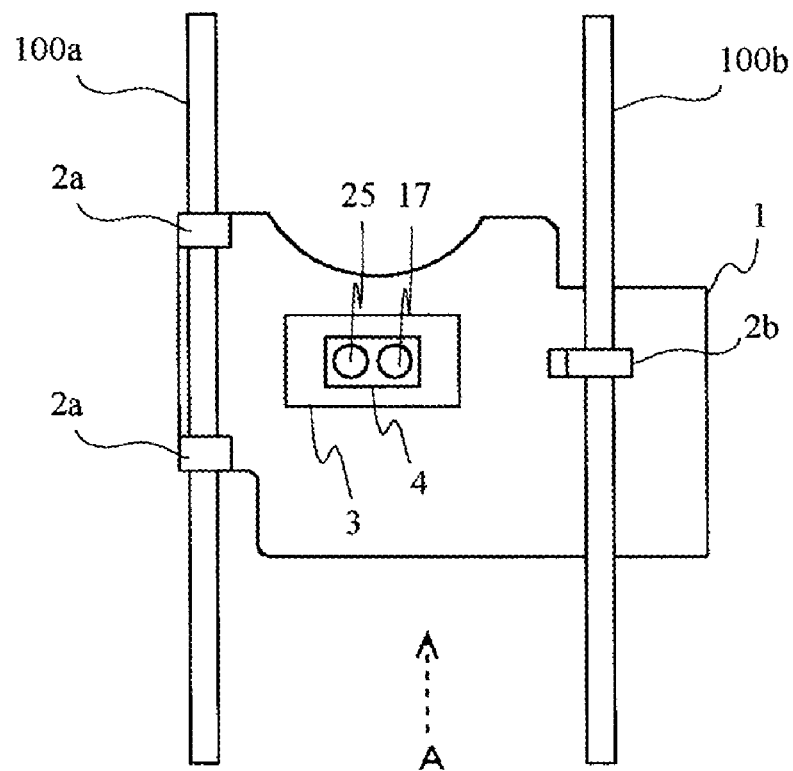
FIG. 1 is a schematic plan view showing a structure of an optical pickup according to an embodiment.
Figure 2:
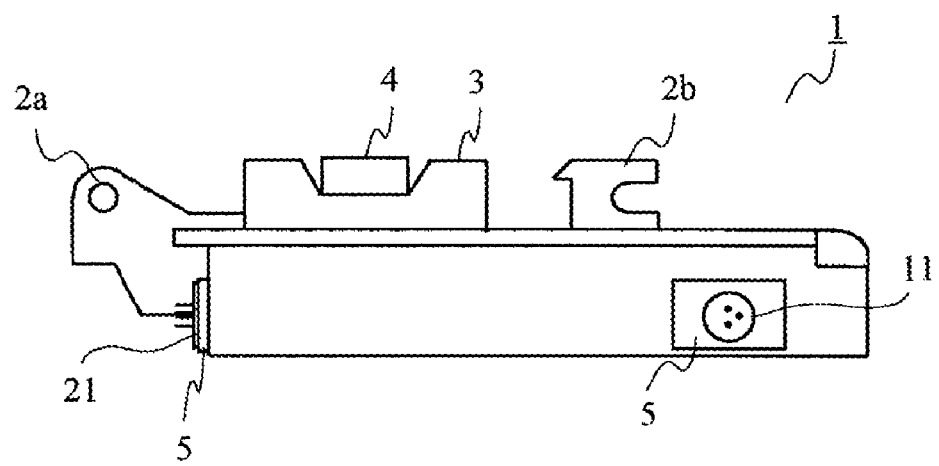
FIG. 2 is a schematic side view showing an optical pickup according to the present embodiment, that is, a side view seen from a position-A side in FIG. 1.

Optical-Pickup Structure: First, a structure of an optical pickup according to an embodiment is explained. FIG. 1 is a schematic plan view showing a structure of an optical pickup according to the present embodiment. FIG. 2 is a schematic side view showing an optical pickup according to the present embodiment, that is, a side view seen from a position-A side in FIG. 1. In FIG. 1, for explanation convenience, guide shafts 100a and 100b that are not constituent members of the optical pickup are shown as well.

An optical pickup 1 directs laser light to an optical disc, not shown, (with reference to FIG. 1, disposed at a position over the paper surface of FIG. 1), receives reflected light reflected by the optical disc, transduces optical signals into electrical signals and outputs them. As shown in FIG. 1, generally, the optical pickup 1 is disposed movably along the two guide shafts 100a and 100b that extend in directions parallel to the radial direction of the optical disc. Thus, the optical pickup 1 is able to access each address formed on the optical disc that rotates at high speed, and it is possible to carry out reading and writing of information from and to the optical disc.

As shown in FIG. 1, the optical pickup 1 is equipped with guide-shaft support portions 2a and 2b that allow the optical pickup 1 to be slidably mounted on the two guide shafts 100a and 100b. Besides, as shown in FIGS. 1 and 2, the optical pickup 1 comprises a first light source 11, a second light source 21, a first objective lens (objective) 17, and a second objective 25. Light emitted from the first light source 11 is condensed on a recording layer of the optical disc by the first objective 17. Laser light emitted from the second light source 21 is condensed on the recording layer of the optical disc by the second objective 25.

The optical pickup 1 according to the present embodiment is so disposed that the optical pickup 1 is able to perform reading and writing of information from and to three kinds of optical discs, BD, DVD and CD. The first light source 11 is a semiconductor laser device for a BD that emits laser light having a wavelength of, for example, 405 nm. The second light source 21 is a semiconductor laser device (two-wavelength laser) for a DVD and a CD that is able to emit, for example, laser light having a wavelength of 650 nm and laser light having a wavelength of 780 nm switching them. As the two-wavelength laser, what is called a monolithic semiconductor laser device or a hybrid semiconductor laser device is preferably used. Laser light emitted from the first and second light sources 11 and 21 is linearly polarized light.

Figure 3:
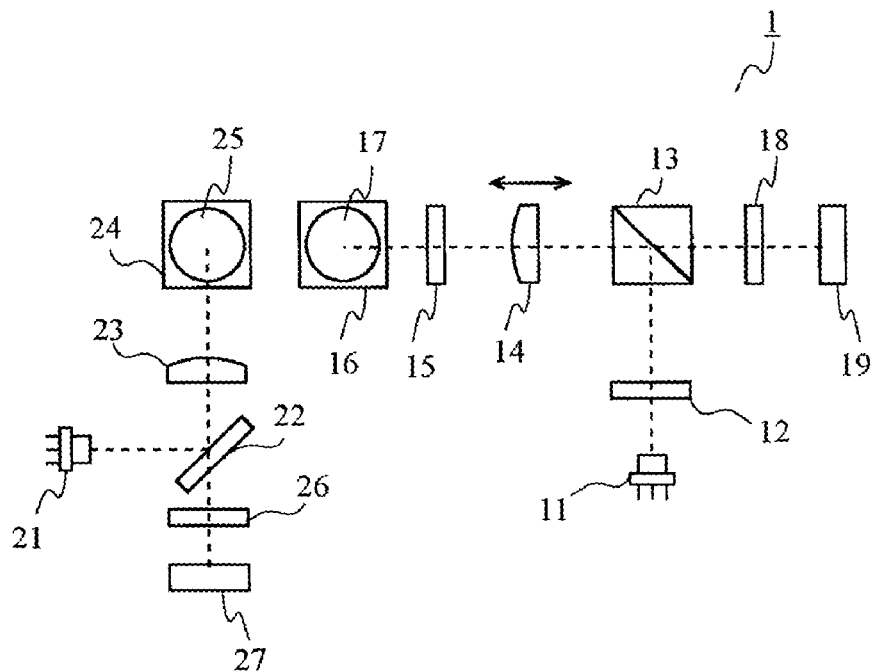
FIG. 3 is a schematic plan view showing an optical system of an optical pickup according to the present embodiment.

FIG. 3 is a schematic plan view showing a structure of an optical system of the optical pickup 1 according to the present embodiment. As shown in FIG. 3, in the optical pickup 1 according to the present embodiment, a route through which laser light emitted form the first light source travels to the first objective 17 is different from a route through which laser light emitted from the second light source 21 travels to the second objective 25.

Laser light (linearly polarized light) emitted from the first light source 11 is divided by a diffraction device 12 into main light and sub-light. Then, the light is reflected by a polarization beam splitter 13 and passes through a first collimate lens 14. The first collimate lens 14 is disposed slidably in an optical-axis direction (a direction indicated by an arrow in FIG. 3) to be able to correct spherical aberration. Convergent and divergent states of light entering the first objective 17 is able to be changed by adjusting the position of the first collimate lens 14.

The laser light having passed through the first collimate lens 14 is transformed by a ¼ (quarter) wave plate 15 into circularly polarized light, reflected by a first raising mirror 16, and the traveling direction is changed to a direction (a direction from the paper surface toward a point over the paper surface of FIG. 3) to the optical disc. The light reflected by the first raising mirror 16 is condensed by the first objective 17 on the recording layer of the optical disc.

Then, the reflected light reflected by the recording layer passes through the first objective 17 and is reflected by the first raising mirror 16, and transformed by the ¼ wave plate 15 into linearly polarized light. Here, the polarization direction is a direction that is rotated by 90° to the polarization direction of the linearly polarized light emitted from the first light source 11.

The reflected light having passed the ¼ wave plate 15 passes through the first collimate lens 14 and the first beam splitter 13, undergoes astigmatism by a first cylindrical lens 18 and is received by a first photo detector 19. The first photo detector 19 transduces the received light into an electrical signal and outputs it. The outputted electrical signal is processed into a reproduction RF signal, a focus error signal, a tracking error signal or another signal.

Laser light (linearly polarized light) emitted from the second light source 21 is reflected by a half mirror 22, and transformed by a second collimate lens 23 into parallel light. The parallel light transformed by the second collimate lens 23 is reflected by a second raising mirror 24, and its traveling direction is changed to a direction (in FIG. 3, a direction from the paper surface toward a point over the paper surface) to the optical disc. The light reflected by the second raising mirror 24 is condensed by the second objective 25 on the recording layer of the optical disc.

Then, the reflected light reflected by the recording layer passes through the second objective 25, is reflected by the second collimate lens 23, passes through the half mirror 22, undergoes astigmatism by a second cylindrical lens 26, and received by a second photo detector 27. The second photo detector 27 transduces the received light signal into an electrical signal and outputs it. The outputted electrical signal is processed into a reproduction RF signal, a focus error signal, a tracking error signal or another signal.

The first and second objectives 17 and 25 are mounted on the same movable member 4 (see FIG. 2) and are able to be moved by an objective actuator 3 (see FIG. 1 or 2) in a focusing direction (a direction perpendicular to the paper surface of FIG. 1) and in a tracking direction (a direction parallel to the guide shafts 100a and 100b in FIG. 1). Focusing adjustment and tracking adjustment are able to be carried out based on the focus error signal and the tracking error signal described above.

In the optical pickup 1 having the structure according to the present embodiment described above, both first and second light sources 11 and 21 are mounted on the main body portion of the optical pickup 1 with held by the light-source holder 5 as shown in FIG. 2. In the optical pickup 1 according to the present embodiment, the polarization direction of linearly polarized light emitted from the first light source 11 is different from the polarization direction of linearly polarized light emitted from the second light source 21. Accordingly, mount angles of the first and second light sources 11 and 21 to the light-source holder are different from each other, and conventionally it is necessary to prepare two kinds of light-source holders. However, one kind of the light-source holder 5 used in the optical pickup 1 according to the present embodiment is compatible with both first and second light sources 11 and 21 that have different mount angles, and it is unnecessary to prepare two kinds of light-source holders.

Figure 4:
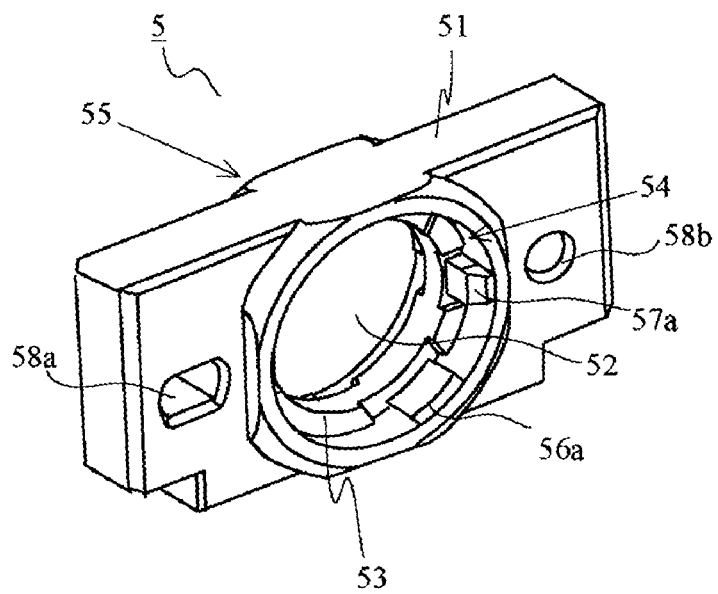
FIG. 4 is a schematic perspective view showing a structure of a light-source holder according to an embodiment.
Figure 5:
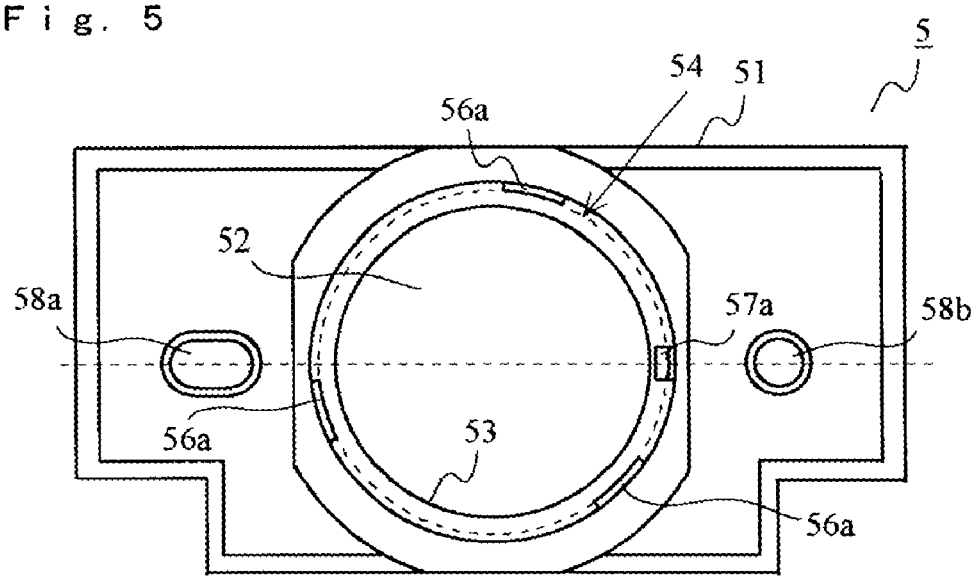
FIG. 5 is a schematic plan view showing a structure of a light-source holder according to the present embodiment.
Figure 6:
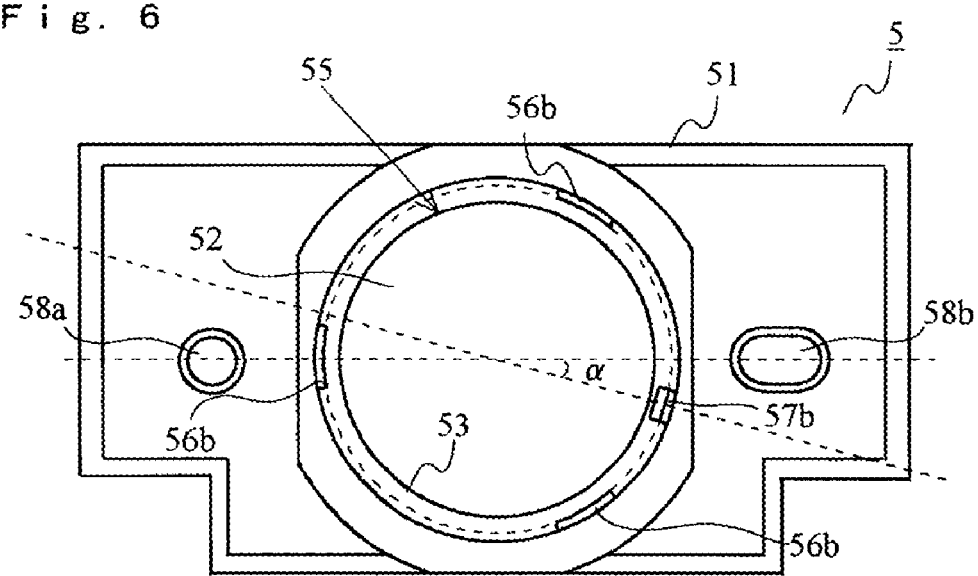
FIG. 6 is a schematic plan view seen from a rear side of the light-source holder according to the present embodiment shown in FIG. 5.
Figure 7A:
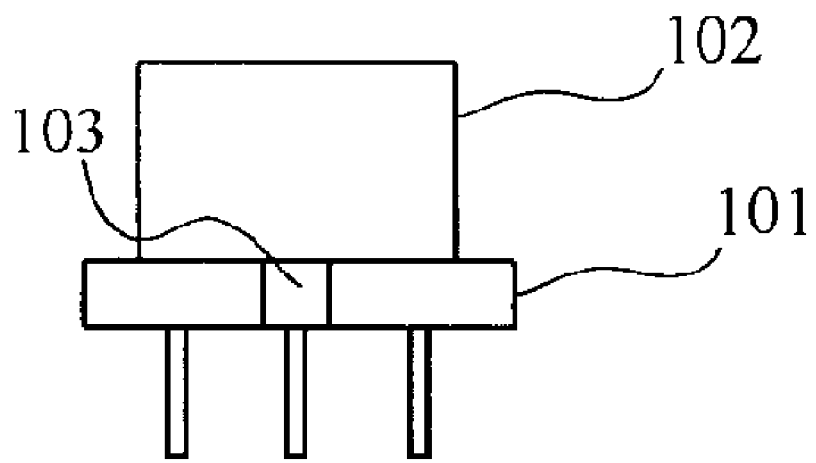
FIG. 7A is a view to explain a structure of a semiconductor laser device that is held in a light-source holder according to the present embodiment, that is, a view seen from side of the semiconductor laser device.
Figure 7B:
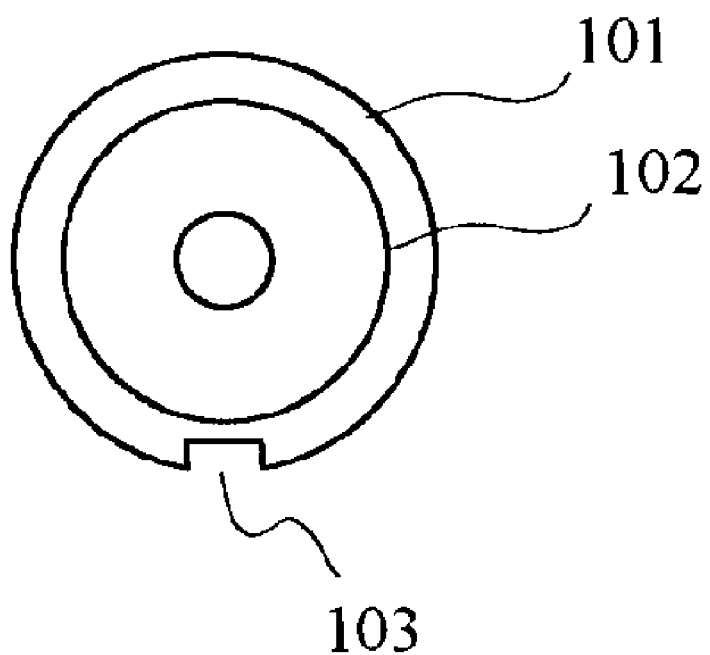
FIG. 7B is a view to explain a structure of a semiconductor laser device that is held in a light-source holder according to the present embodiment, that is, a view seen from over the semiconductor laser device.

Light-Source Holder Structure: Hereinafter, a structure of the light-source holder 5 according to the present embodiment is explained. FIG. 4 is a schematic perspective view showing a structure of the light-source holder 5 according to the present embodiment. FIG. 5 is a schematic plan view showing a structure of the light-source holder 5 according to the present embodiment. FIG. 6 is a schematic plan view seen from a rear side of the light-source holder 5 according to the present embodiment shown in FIG. 5. FIG. 7A is a view to explain a structure of a semiconductor laser device (the first light source 11 or the second light source 21) that is held by the light-source holder 5 according to the present embodiment, that is, a view seen from side of the semiconductor laser device. FIG. 7B is a view to explain a structure of a semiconductor laser device (the first light source 11 or the second light source 21) that is held by the light-source holder 5 according to the present embodiment, that is, a view seen from over the semiconductor laser device.

The light-source holder 5 is used to fix a light source, and is made of a material (e.g., aluminum alloy or the like) that is able to be easily deformed elastically and has good heat radiation. The light-source holder 5 has a structure in which a through hole 52 penetrating the holder main body 51 is formed through a substantially central portion of the plate-shape holder main body 51. A semiconductor laser device that serves as the first light source 11 or the second light source 21 is fitted into this through hole 52.

As shown in FIGS. 7A and 7B, the semiconductor laser devices that respectively serve as the first light source 11 and the second light source 21 have a structure that comprises a cylinder-shape base 101 on which a chip that emits laser light is fixed, and a cylinder-shape cap 102 that is fixed on the base 101 to cover the chip.

As shown in FIG. 4, a ring-shape stopper portion 53 is formed on an inner wall of the through hole 52 of the light-source holder 5. The stopper portion 53 is formed on a substantially central portion in the penetration direction of the through hole 52. Besides, the stopper portion 53 is so formed that the base 101 of the semiconductor laser device comes into contact with the stopper portion 53 when the semiconductor laser device that serves as the first light source 11 or the second light source 21 is fitted into (press-fitted in the present embodiment) the through hole 52. In other words, the stopper portion 53 has a function (a blocking function) to prevent the semiconductor laser device from coming off the light-source holder 5 when the semiconductor laser device is press-fitted in the through hole 52.

The light-source holder 5 according to the present embodiment is so structured that a front side of the light-source holder 5 with respect to the stopper portion 53 functions as a first hold portion 54 to hold a semiconductor laser device that serves as the first light source 11, and an inner side of the light-source holder 5 with respect to the stopper portion 53 functions as a second hold portion 55 to hold a semiconductor laser device that serves as the second light source 21 (see FIG. 4). In this respect, FIG. 5 is a schematic plan view of the light-source holder 5 seen from the side of the first hold portion 54, and FIG. 6 is a schematic plan view of the light-source holder 5 seen from the side of the second hold portion 55.

As shown in FIG. 5, the first hold portion 54 is provided with first press ribs 56a (first press portions) at three positions that protrude from the inner wall of the through hole 52. The surface of this first press rib 56a has a curved surface along part (arc) of a circle presented by a broken line shown in FIG. 5. Besides, the three first press ribs 56a are so formed that the diameter of the circle indicated by a broken line in FIG. 5 becomes slightly smaller than the diameter of the base 101 of the semiconductor laser device that serves as the first light source 11. Accordingly, with reference to FIG. 5, if the semiconductor laser device is press-fitted into the through hole 52 with the base 101 disposed at a position away from the paper surface and the cap 102 disposed at a position closer to the paper surface in the direction from a point away from the paper surface to a point closer to the paper surface, the first press rib 56a is able to push the base 101 to hold the semiconductor laser device.

As shown in FIG. 5, the first hold portion 54 is provided with a first positioning rib 57a (first engagement portion) that protrudes from the inner wall of the through hole 52. As shown in FIGS. 7A and 7B, a groove 103 having a substantially rectangular shape in section is formed on the base 101 of the semiconductor laser device that serves as the first light source 11. This groove 103 is formed to identify, for example, the polarization direction of laser light emitted from the semiconductor laser device. Accordingly, if the positioning rib 57a that engages with the groove 103 formed on the semiconductor laser device is disposed at a predetermined position of the light-source holder 5, it is possible to dispose the semiconductor laser device in the light-source holder 5 with the polarization direction of laser light (linearly polarized light) emitted from the first light source 11 set to a predetermined direction. The first positioning rib 57a is formed for this intention.

As shown in FIG. 6, like the first hold portion 54, the second hold portion 55 also is provided with second press ribs 56b (second press portions) at three positions that protrude from the inner wall of the through hole 52. Besides, like the first positioning rib 57a of the first hold portion 54, a second positioning rib 57b (second engagement portion) that protrudes from the inner wall of the through hole 52 is formed. However, the positions of the press ribs of the first hold portion 54 and the second hold portion 55 are different from each other, and the positions of the positioning ribs of the first hold portion 54 and the second hold portion 55 are different from each other.

In other words, the second press ribs 56b and the second positioning rib 57b are formed at positions respectively rotated by an angle of a to the positions where the first press ribs 56a and the first positioning rib 57a are formed. This is because in the optical pickup 1 according to the present embodiment, it is necessary to shift the polarization directions of laser light emitted from the first light source 11 and from the second light source by the angle of α from each other.

Because the light-source holder 5 is so structured as in the present embodiment, effects are obtained as follows. In other words, with reference to FIG. 4, when using the light-source holder 5 for the first light source 11, if the semiconductor laser device is press-fitted into the through hole 52 with the base 101 disposed at a position away from the paper surface and the cap 102 disposed at a position closer to the paper surface, it is possible to dispose the light-source holder 5 that holds the semiconductor laser device at a desired mount angle in the optical pickup 1. Besides, with reference to FIG. 4, when using the light-source holder 5 for the second light source 11, if the semiconductor laser device is press-fitted into the through hole 52 with the cap 102 disposed at a position away from the paper surface and the base 101 disposed at a position closer to the paper surface, it is possible to dispose the light-source holder 5 that holds the semiconductor laser device at a desired mount angle in the optical pickup 1. Here, when press-fitting the semiconductor laser device into the through hole 52, the cap 102 is first inserted and then the base 101 is.

In the light-source holder 5 according to the present embodiment, as shown in FIGS. 4 to 6, holes 58a and 58b that penetrate the holder main body 51 are formed interposing the through hole 5 therebetween, that is, one on each side. The holes 58a and 58b are jig holes that allow the light-source holder 5 to be held with jigs and also optical-axis alignment of the first and second light sources 11 and 21 to be performed. Considering dimensional tolerances of the light-source holder 5 and jigs, one of the jig holes 58a and 58b is formed oblong. And, because the jig holes 58a and 58b are so formed to be through holes, even if the light-source holder 5 is used for any one of the first light source 11 and the second light source 21, it is possible to perform optical-axis alignment of the light source.

Others: The present embodiments explained above are examples, the present invention is not limited to the present embodiments and various modifications are possible without departing the objects of the present invention.

For example, in the present embodiments, the numbers of first press ribs 56a and second press ribs 56b are each three. However, the numbers are not limited to three, and can be changed suitably. Besides, the shapes of the press ribs 56 and 56b also are not limited to those in the present embodiments, and other shapes may be used if a semiconductor laser device can be held by press-fitting the semiconductor laser device into the through hole 52.

In the present embodiments, the numbers of first positioning ribs 57a and second positioning ribs 57b are each one. However, the numbers are not limited to one, and may be changed suitably for a structure of a semiconductor laser device. Besides, the shapes of the positioning ribs 57a and 57b may be changed suitably for a shape of the groove 103 formed on a semiconductor laser device.

In the present embodiments, the light-source holder 5 is used for the first and second light sources that have the same shape. However, the shapes of the first and second light sources 11 and 21 can be different from each other (also different in size). The light-source holder according to the present invention is applicable to such a case. In other words, in the first and second hold portions 54 and 55, shapes of the parts to hold a light source need only to be different for a shape of the light source.

In the present embodiments, the first light source 11 is a semiconductor laser device for a BD, and the second light source 21 is a semiconductor laser device for a DVD and a CD. However, the present invention is not limited to this structure, and it is needless to say that the present invention is widely applicable to optical pickups that use a plurality of light sources.

The light-source holder according to the present invention is preferably applicable to optical pickups that comprise two light sources.

What is claimed is:

1. A light-source holder used to hold a light source disposed in an optical pickup, comprising:
   a holder main body portion;
   a through hole which penetrates the holder main body portion and in which a light source is fitted;
   a first hold portion that holds a first light source which is fitted in the through hole;
   and a second hold portion that holds a second light source which is a different kind of light source from the first light source and fitted in the through hole;
   of a first side and a second side which are opposite to each other with respect to the holder main body portion, the first hold portion is disposed on the first side, and the second hold portion is disposed on the second side; a groove portion is formed on the first and second light sources, the first holder portion is equipped with a first engagement portion that protrudes from the inner wall of the through hole and engages with the groove portion of the first light source, and the second holder portion is equipped with a second engagement portion that protrudes from the inner wall of the through hole and engages with the groove portion of the second light source, wherein the first engagement portion is rotationally offset relative to the second engagement potion with respect to an optical axis of the through hole.

2. The light-source holder according to claim 1, wherein
a ring-shape stopper portion protruding from an inner wall of the through hole is formed at a substantially central portion in a penetration direction of the through hole,
the first and second hold portions are formed at positions which are opposite to each other with respect to the stopper portion,
the first hold portion is provided with a first press portion which protrudes from the inner wall of the through hole and presses part of the first light source fitted in from the first side, and
the second hold portion is provided with a second press portion which protrudes from the inner wall of the through hole and presses part of the second light source fitted in from the second side.

3. The light-source holder according to claim 2, wherein jig holes are so formed through the holder main body portion as to be opposite to each other with respect to the through hole, penetrate the holder main body portion in the same direction as the through hole, and allow the holder main body portion to be held with jigs.

4. An optical pickup, comprising the light-source holder according to claim 2, the first light source, and the second light source.

5. The optical pickup according to claim 4, wherein the first light source is a semiconductor laser device that emits laser light for a BD, and the second light source is a semiconductor laser device that emits laser light switching for a DVD and a CD.

6. The light-source holder according to claim 1, wherein jig holes are so formed through the holder main body portion as to be opposite to each other with respect to the through hole, penetrate the holder main body portion in the same direction as the through hole, and allow the holder main body portion to be held with jigs.

7. An optical pickup, comprising the light-source holder according to claim 1, the first light source, and the second light source.

8. The optical pickup according to claim 7, wherein the first light source is a semiconductor laser device that emits laser light for a BD, and the second light source is a semiconductor laser device that emits laser light switching for a DVD and a CD.

* * * * *